United States Patent Office 3,215,678
Patented Nov. 2, 1965

3,215,678
COPOLYMERS OF ETHYLENE WITH VINYL ESTERS AND ALPHA-BETA ETHYLENICALLY UNSATURATED ACIDS
Robert L. Adelman, Wilmington, Del., assignor to E. I. du Pont de Nemours and Company, Wilmington, Del., a corporation of Delaware
No Drawing. Filed June 21, 1961, Ser. No. 118,522
9 Claims. (Cl. 260—80.5)

This invention relates to ethylene copolymers and particularly to copolymers of ethylene with certain ester and acid comonomers.

It is an object of the invention to provide new ethylene copolymers. A further object is to provide ethylene copolymers which are especially well suited for adhesive and coating purposes. A particular object is to provide new copolymers of ethylene with certain ester and acid comonomers. Further objects will be apparent from the following description.

The copolymers of the invention are copolymers, i.e., terpolymers of ethylene with (a) at least 5% by weight of a vinyl ester of a lower (1–6 carbon) saturated monobasic aliphatic carboxylic acid and (b) 0.01 to 10% by weight of acrylic or methacrylic acid, with the balance consisting essentially of ethylene. The ethylene component content of the copolymer should be at least 65% of the copolymer weight.

The copolymers of the invention have been found to possess excellent adhesive, solubility and other properties desired for general coating and adhesive purposes. Thus, they are well suited for use in modifying petroleum waxes for coating and sealing purposes, and for various adhesive uses including the production of nonwoven fabrics.

The generally poor solubility of ethylene homopolymers in petroleum waxes and solvents such as benzene, toluene, xylene, trichloroethylene and perchloroethylene is related at least in part to their relatively high crystallinity. The present copolymers are relatively soluble in or compatible with the above materials, apparently because they are either amorphous or possess a low degree of crystallinity. The copolymer component chiefly responsible for reducing or eliminating crystallinity of the copolymer (and increasing its compatibility with the above materials) is the vinyl ester component thereof. Worthwhile reduction of crystallinity results from the presence of as little as 5% of that component in the copolymer. Reduction of crystallinity increases as the content of the ester component is increased up to about 30%, at which content copolymer crystallinity becomes substantially insignificant. However, wax compatibility again decreases as the ester content is increased beyond about 35% so that polymers containing more than about that amount of the ester are not generally suitable for the present purposes. The ester content preferably will be at least 12% of the copolymer weight, the most preferred range being 20 to 30%.

In contrast with ethylene homopolymers, which have poor adhesive properties, the present copolymers have excellent adhesive properties which appear to be due chiefly to the acid component thereof. As little as 0.01% of the acid component, based upon the weight of the copolymer, exerts a significant and worthwhile improvement in adhesive properties and renders the copolymer curable. Acid component contents greater than about 10% are generally not required to obtain the adhesive and/or curing properties desired.

Any vinyl ester of a 1–6 carbon saturated monobasic carboxylic acid can be used as the ester monomer in preparing the copolymers of the invention. The preferred esters are vinyl formate, vinyl propionate and the vinyl butyrates, i.e., the esters of 1–4 carbon acids. However, for cost and availability reasons as well as because of its over-all effectiveness, the most preferred ester is vinyl acetate.

One important use of the present copolymers is as modifiers of petroleum waxes for coating and sealing applications. For such use, the acid component of the copolymer preferably will not exceed 3% by weight of the copolymer, since greater amounts adversely affect the compatibility of the copolymers with petroleum waxes. The most preferred acid component contents of the copolymers for use in modifying petroleum waxes range from 0.1 to 1%.

Another important use of the present copolymers is as adhesives in the production of nonwoven fabrics. For such use, the acid component content of the copolymers may range from 0.01 to 10% but the generally desired degrees of adhesiveness and curability are most generally obtained at acid component contents ranging from about 0.1 to 7%.

The copolymers of the invention can be readily prepared by copolymerizing a mixture of the comonomers in the presence of a free-radical polymerization initiator such as a peroxygen compound, e.g., lauryl peroxide or t-butyl peracetate, or an azobis compound, e.g., azobisisobutyronitrile, at a somewhat elevated temperature, e.g., 90–250° C., and a pressure of 1000 to 1750 atmospheres, then separating the copolymer from the unpolymerized materials, e.g., by vaporization of the latter. By varying the monomers employed, the concentrations of the monomers and initiator in the reaction mixture, and conditions such as reaction time, pressure and temperature, copolymers of the desired kind and degree of polymerization can be obtained. The copolymers can be made by batch polymerization methods, but non-homogeneous copolymers generally result. Continuous methods in which a suitable mixture of the comonomers and initiator is continuously passed through a reaction zone maintained at the desired temperature and pressure conditions, are distinctly preferred since they yield substantially homogeneous copolymer products. The reaction zone and rate of flow of reaction mixture therethrough should be such as to provide an appropriate residence time.

The melt index (M.I.) of a polymer is well recognized as being related to its molecular weight, the lower the melt index the higher being the molecular weight. The melt index values reported herein were determined by the tentative ASTM test method D1238–52T (ASTM Standards, 1955, Part 6, pages 292–295). Each value is the weight in grams that is extruded through an orifice 0.0825 inch in diameter and 0.315 inch long over a period of 10 minutes at 190° C. under a pressure of 2160 grams. The melt index values of the copolymers of the invention range from 0.5 to 200 and are preferably about 5 to 25.

The term "petroleum wax" as used herein embraces both paraffin and microcrystalline waxes. Paraffin waxes are mixtures of solid hydrocarbons derived through the fractional distillation of petroleum. After purification, they contain hydrocarbons that fall within the formula range of $C_{23}H_{48}$ to $C_{29}H_{60}$. They are colorless, hard translucent materials having melting points of about 130–165° F. Microcrystalline waxes are also obtained through petroleum distillation. They differ from paraffin waxes in being more branched and of higher molecular weight. They are more plastic than paraffin waxes and have melting points of about 165–200° F. For use in making blends with the present copolymers, paraffin waxes are generally preferred over microcrystalline waxes because they provide better moisture proofing and are generally of better color.

The invention is illustrated by the following examples.

All proportions expressed herein as percentages are by weight.

Example 1

Ethylene, vinyl acetate, methacrylic acid and benzene (solvent) were fed continuously at rates, respectively, of 10.01, 4.49, 0.01 and 2.70 lbs./hr. into and through a two-liter stirred autoclave maintained at a temperature of 140–150° C. and a pressure of 1450 atmospheres. Azobisisobutyronitrile initiator was also fed continuously at a rate equivalent to about 0.8 lb./1000 lbs. of polymer product. The residence time in the autoclave was about 15 minutes. The reaction mixture continuously removed from the autoclave was stripped of unpolymerized monomers and solvent under reduced pressure and at elevated temperature. After operations had reached a steady state, the conversion of monomers to copolymer was 12.4%. The copolymer had a melt index of 14.1 and contained 29.2% vinyl acetate and 0.7% methacrylic acid (the balance being ethylene).

Other copolymers of the invention can be produced in a similar manner by substituting, for example, vinyl formate, vinyl propionate or a vinyl butyrate in place of vinyl acetate, and/or by employing acrylic acid in place of methacrylic acid. The substitution of acrylic acid for methacrylic acid gives an ethylene/vinyl acetate/acrylic acid copolymer very similar in properties to the ethylene/vinyl acetate/methacrylic acid copolymer.

Example 2

A flexible coated paper was prepared by coating a titanium dioxide coated sulfite paper on one side with a paraffin wax-copolymer blend at a coating weight of 14 lbs./ream. Coating was effected using a Mayer Machine Company laboratory waxing machine in which the coating composition is applied by rollers and is metered by metal scraping blades. The blend, which was applied as a solution in toluene, contained 70% wax (M.P., 62° C.) and 30% of a copolymer of ethylene with 30% vinyl acetate and 0.6% methacrylic acid. The melt index of the copolymer was 22. The coated paper had a blocking temperature of 141° F. Its heat-seal strengths (at sealing conditions of 225° F., 30 lbs. pressure, 2 sec.) were: paper to paper, 450; paper to aluminum, 240; and paper to cellophane, 410.

For a partial comparison, a similarly coated paper was made with a coating (13.2 lb./ream) of a wax-copolymer blend containing 30% of a copolymer (M.I., 15) of ethylene with 29.9% of vinyl acetate and no acid component. Its blocking temperature was 115° F. and its heat-seal strengths were: paper to paper, 302; paper to aluminum, 126; and paper to cellophane, 80.

As reported herein: the "haze point" of a copolymer-wax blend is the temperature (° C.) at which a melt of the blend shows the first sign of phase separation, as indicated by the development of a distinct haze, upon being cooled at a rate of 1° C. per minute.

All "blocking temperatuers" reported were determined by TAPPI Suggested Method T652SM–57.

The "heat-seal strengths" reported were determined by TAPPI Suggested Method T642SM–54. They represent the force in grams required to separate sealed strips of paper one inch wide (g./in.) from a substrate. The "paper to paper" values are those for seals between the coated sides of two strips of paper. The other values are for seals between the coated side of a strip of paper and the uncoated side of a substrate such as glassine or aluminum foil. The seals tested were made on a Palo Meyers Sealer and the seal strengths reported were measured on an Instron Tensile Tester.

The "water vapor transmission" (WVT) rates reported represent the weight in grams of water vapor permeating 100 in.$^2$ of sample in 24 hours at 100° F. and 98% relative humidity. The test method used was essentially that of TAPPI Method T464M–45. Flat and crease values are reported. In determining the crease values for paper coated with a wax blend containing 10% of a copolymer, the TAPPI Method was modified by employing a ratio of linear crease (in.) to area (in.$^2$) of 1.63 with no crossover of creases.

Example 3

A flexible coated paper was prepared as indicated in Example 2 using a paraffin wax-copolymer blend containing 40% of a copolymer of ethylene with 29.7% vinyl acetate and 0.6% methacrylic acid (M.I., 22). The coating weight was 17 lbs./ream. The blocking temperature was 123° F. and the heat-seal strengths were: paper to paper, 207; paper to aluminum, 213; paper to cellophane, 212.

A similarly coated paper was made with a coating (16 lbs./ream) of a wax-copolymer blend containing 40% of a copolymer of ethylene with about 29% vinyl acetate and no acid component and having a melt index of about 15. Its blocking temperature was 116° F., and its heat-seal strengths were: paper to paper, 200; paper to aluminum, 90; and paper to cellophane, 180.

Example 4

A copolymer of ethylene with 27.5% vinyl acetate and 0.74% methacrylic acid (the balance being ethylene) having a melt index of 13.1 was dissolved in a paraffin wax having a melting point of 62° C. The resulting blend contained 10% of the copolymer and had a haze point of 72° C. A breadwrap paper was coated on both sides with the blend at a coating weight of 14.2 lbs./ream using a Talboys Lab Coater #1500 C. at a coating temperature of 225° F. The coated paper had a blocking temperature of 136° F. When air cooled, it had a WVT rate of 0.99 for the flat value and 2.70 for the crease value. When water quenched, it showed heat-seal strengths of: paper to paper, 110; paper to glassine, 39; and paper to aluminum, 52.

Example 5

A flexible paper was prepared by coating a titanium dioxide coated sulfite paper on one side with a paraffin wax-copolymer blend at a coating weight of 13.7 lbs./ream using a Talboys Lab Coater #1500 C. The blend contained 70% wax (M.P., 62° C.) and 30% of a copolymer (M.I., 13) of ethylene with 27.5% vinyl acetate and 0.7% methacrylic acid. The coated paper had a blocking temperature of 135° F. and its heat-seal strengths were: paper to paper, 434; paper to aluminum, 388; paper to a polyester substrate, 298; paper to cellophane, 374; and paper to polyethylene, 386.

A similar coated paper was prepared under similar conditions except that the copolymer component of the blend was a copolymer (M.I., 11) of ethylene with 28.8% vinyl acetate and 0.7% methacrylic acid and the coating weight was 15 lbs./ream. The coated paper had a blocking temperature of 137° F. and its heat-seal strengths were: paper to paper, 536; paper to aluminum, 356; paper to polyester substrate, 276; paper to cellophane, 360; and paper to polyethylene, 386.

For comparison, a similar coated paper was prepared under similar conditions except that the copolymer component of the blend was a copolymer (M.I. 15.7) of ethylene with 29.4% vinyl acetate (no methacrylic acid). The coated paper had a blocking temperature of 114° F. and its heat-seal strengths were: paper to paper, 302; paper to aluminum, 218; paper to polyester substrate, 234; paper to cellophane, 196; and paper to polyethylene, 282.

Example 6

A copolymer of ethylene with 19% vinyl acetate having an inherent viscosity of 0.97 (as a 0.25% solution in toluene at 30° C.) and a melt index of 0.1 was used to bond the fibers of a nonwoven web of randomly oriented 3-denier viscose-process crimped rayon fibers of 1$\frac{9}{16}$ inch length. The basis weight of the web was 3.0 oz./ yd.². The web, handled between coarse bronze screens, was immersed in about a 7% solution of the copolymer in toluene and excess solution was removed by pressing the web between rollers. The retained polymer was coagulated within the web by spraying the web with 50 g. methanol and then immersing it in 500 g. methanol. Excess solvents were removed by passing between rollers, after which the web was removed from the supporting screens and dried in a circulating air oven at 125° C. The resulting dried nonwoven fabric was pressed between 40 mesh screens (made of 0.01 in. diameter stainless steel wire) at 300° F. for 3 minutes at a pressure of 60 lbs./sq. in. to create a surface resembling a woven textile. After 2 hours at room temperature, the fabric reached a constant weight corresponding to a copolymer loading of 33% of the fabric weight.

Three other nonwoven fabrics were similarly made using the same copolymer and rayon randoweb, but at copolymer loadings of 47.0%, 26.3% and 23.2%. After the 4 nonwoven fabrics were conditioned by overnight storage at 75° F. and 50% relative humidity, the following properties of the fabrics were measured by the indicated modifications of standard ASTM tests:

(a) "Dry breaking strength" expressed as $$\frac{lbs./in.}{oz./yd.^2}$$

(ASTM test D1117–59). Average of values obtained on each of three 1 x 3-inch test strips mounted between jaws 2 inches apart at a pulling rate of 1 inch per minute.

(b) "Perchlorethylene breaking strength"—same as for (a) but for samples soaked in perchlorethylene for 2 hours at 75° F. and tested while still wet.

(c) "Detergent breaking strength"—same as for (a) but for samples boiled for 1 hour in a 0.1% aqueous solution of a commercial laundry detergent composition, rinsed in cold water and tested while still wet.

(d) "Tear strength" (ASTM tongue tear method D–39). Average of values obtained on each of three 2 x 2.5 in. test pieces using a 1-inch jaw separation and a pulling rate of 12 in./min.; results expressed as $$\frac{lbs.}{oz./yd.^2}$$

(e) "Stiffness" expressed as length of overhang in inches. Average of 4 readings on a single 1 x 6 inch strip (ASTM cantilever bend test D1388–55T).

The above property values of the 4 nonwoven fabrics were plotted on rectangular coordinate graph paper and corresponding values for a nonwoven fabric with an arbitrary copolymer loading of 35% were determined by graphical interpolation of the plotted data. The results were:

Breaking strengths _____ Dry, 3.6; perchlorethylene, 1.7; and detergent, 1.4.
Stiffness _____ 4.6.
Tear strength _____ 0.44.

*Example 7*

Using the rayon randoweb of Example 6 and a copolymer of ethylene with 17.7% vinyl acetate and 1.3% methacrylic acid having an inherent viscosity of 0.85 and a melt index of 2.2, 4 nonwoven fabrics were prepared and tested as described in Example 5. Results for the nonwoven fabric with an arbitrary 35% copolymer loading were:

Breaking strengths _____ Dry, 3.6; perchlorethylene, 1.1; and detergent, 1.9.
Stiffness _____ 4.3.
Tear strength _____ 0.30.

When Example 7 was repeated using as crosslinking agents 5 parts per hundred (p.p.h.) of copolymer of 2,2-bis(p-glycidoxyphenyl) propane, 10 p.p.h. of a butylated melamine-formaldehyde resin and 0.5 p.p.h. of monobutyl acid orthophosphate, the corresponding results were:

Breaking strengths _____ Dry, 4.0; perchlorethylene, 1.9; and detergent, 2.0.
Stiffness _____ 4.8.
Tear strength _____ 0.3.

The above crosslinking agents were incorporated into both the toluene solution of the copolymer and the methanol coagulant in such amounts as to provide the indicated concentrations in the copolymers. As is evident from the data, the effect of the crosslinking agents is to increase the breaking strengths and stiffness.

*Example 8*

Data corresponding to those of Examples 6 and 7 for nonwoven fabric prepared from the same rayon randoweb but at a binder loading of 15% using as binder a copolymer of ethylene with 29.2% vinyl acetate and 3.7% methacrylic acid (M.I., 7.1) and employing the crosslinking agents of Example 7 in the proportions there indicated, are as follows:

Breaking strengths _____ Dry, 1.8; perchlorethylene, 0.11; detergent, 0.7.
Stiffness _____ 3.7.
Tear strength _____ 0.66.

Corresponding data for a similar nonwoven fabric prepared using the same copolymer (15% binder loading) and a web of randomly oriented 3-denier nylon fibers 1.5 inches long (basis weight of web, about 2.6 oz./yd.²) were as follows:

Breaking strengths _____ Dry, 6.7; perchlorethylene, 0.3; detergent, 1.5.
Stiffness _____ 3.5.
Tear strength _____ 2.6.

*Example 9*

An ethylene/vinyl acetate/methacrylic acid copolymer (M.I., 6.3) containing 67.5% ethylene, 23.4% vinyl acetate and 9.1% methacrylic acid by weight was used to bond the fibers of a nonwoven web of a randomly oriented polyester (polyethylene terephthalate) fiberfill staple (2" cut length fibers, 4.75 denier per filament, tenacity about 3.5 grams per denier). The basis weight of the web was 2.7 oz./yd.². The web was handled as indicated in Example 6 and was immersed in an 8% solution of the copolymer in warm tetrahydrofuran containing the curing recipe (7.5 p.p.h. of 2,2-bis(p-glycidoxyphenyl) propane, 7.5 p.p.h. of a butylated melamine-formaldehyde resin, and 0.5 p.p.h. of monobutyl acid phosphate, based upon the weight of the copolymer). The excess solution was removed by passing the web between rollers then immediately immersing it in water. By this treatment, the retained copolymer was coagulated within the web. Excess precipitant was removed by passing the web-screen assembly again through rollers, after which the web was removed from the supporting screens and dried in an air oven at 125° C. The dried web was then heat-cured at 400° F. for 3 minutes between polytetrafluoroethylene-coated stainless steel screens. Data obtained at a 34% binder loading in the fabric were as follows:

Breaking strengths _____ Dry, 10.1; perchlorethylene, 5.3; detergent, 9.1.
Stiffness _____ 4.0.
Tear strength _____ 0.6.

The copolymers of the invention are in general soluble in petroleum waxes and solvents such as benzene, toluene, tetrahydrofuran, xylene, trichloroethylene and the like. They can be cured by reacting the carboxyl groups thereof with various agents whereby they are converted to tough, pliable, elastic, insoluble materials resistant to plastic flow at elevated temperatures.

Suitable curing agents, which effect crosslinking, include polyfunctional oxirane compounds, such as 2,2-bis(p-glycidoxyphenyl) propane, and formaldehyde derivatives of polyfunctional amines, such as butylated melamine-formaldehyde resin. The presence of an accelerator, such as monobutyl hydrogen orthophosphate, may also be desirable. Blends of the copolymer with the curing agent, accelerator and, if desired, auxiliary materials to impart specific effects, can be applied to fabric by calendering or spreading from solution, and the coated fabric can be cured by heating for 0.01 to 4 hours at 100 to 210° C.

The copolymers of the invention are well suited for many uses as hot-melt adhesives since they adhere well to many dissimlar surfaces such as paper, paperboard, cloth, glassine, aluminum, "Bonderized" steel and polyvinyl fluoride film. Their excellent adhesive and other desirable properties make them valuable for use as petroleum wax modifiers in the production of wax blends for many coating applications such as the coating of paper. They are also useful as curable adhesives in the production of nonwoven fabrics.

The embodiments of this invention in which an exclusive property or privilege is claimed are defined as follows:

1. A terpolymer of at least 65% ethylene with (a) at least 5% by weight of a vinyl ester of a lower (1–6 carbon) saturated monobasic aliphatic carboxylic acid and (b) 0.01 to 10% by weight of an acid of the group consisting of acrylic and methacrylic acids, said terpolymer having been made by a free-radical initiated polymerization of a mixture of ethylene, said ester and said acid.

2. A terpolymer of at least 65% ethylene with (a) 20 to 30% by weight of a vinyl ester of a 1–4 carbon saturated monobasic aliphatic carboxylic acid and (b) 0.01 to 10% by weight of an acid of the group consisting of acrylic and methacrylic acids, said terpolymer having been made by a free-radical initiated polymerization of a mixture of ethylene, said ester and said acid.

3. A terpolymer of at least 65% ethylene with (a) at least 12% by weight of a vinyl ester of a 1–4 carbon saturated monobasic aliphatic carboxylic acid and (b) 0.1 to 3% by weight of an acid of the group consisting of acrylic and methacrylic acids, said terpolymer having been made by a free-radical initiated polymerization of a mixture of ethylene, said ester and said acid.

4. A terpolymer of at least 65% ethylene with (a) at least 12% by weight of a vinyl ester of a 1–4 carbon saturated monobasic aliphatic carboxylic acid and (b) 0.1 to 7% by weight of an acid of the group consisting of acrylic and methacrylic acids, said terpolymer having been made by a free-radical initiated polymerization of a mixutre of ethylene, said ester and said acid.

5. A terpolymer according to claim 1 wherein the ester is vinyl acetate.

6. A terpolymer according to claim 1 wherein the ester is vinyl acetate and the acid is methacrylic acid.

7. A terpolymer according to claim 1 wherein the ester is vinyl acetate and the acid is acrylic acid.

8. A terpolymer of at least 65% ethylene with 20 to 30% by weight vinyl acetate and 0.1 to 7% by weight methacrylic acid, said terpolymer having been made by a free-radical initiated polymerization of a mixture of ethylene, vinyl acetate and methacrylic acid.

9. A terpolymer of at least 65% ethylene with 20 to 30% by weight vinyl acetate and 0.1 to 7% by weight acrylic acid, said terpolymer having been made by a free-radical initiated polymerization of a mixture of ethylene, vinyl acetate and acrylic acid.

References Cited by the Examiner
UNITED STATES PATENTS

| | | | |
|---|---|---|---|
| 2,519,764 | 8/50 | Jacobson | 260—78.5 |
| 2,854,357 | 9/58 | Johnson et al. | 260—78.5 |
| 3,025,268 | 3/62 | Deex et al. | 260—80.5 |

FOREIGN PATENTS

| | | |
|---|---|---|
| 849,066 | 9/60 | Great Britain. |

JOSEPH L. SCHOFER, *Primary Examiner.*

LEON J. BERCOVITZ, *Examiner.*